Feb. 8, 1966    M. JAKOSKY    3,233,936
EXPANDABLE CARGO COMPARTMENT FOR A VEHICLE
Filed Sept. 16, 1963    2 Sheets-Sheet 1
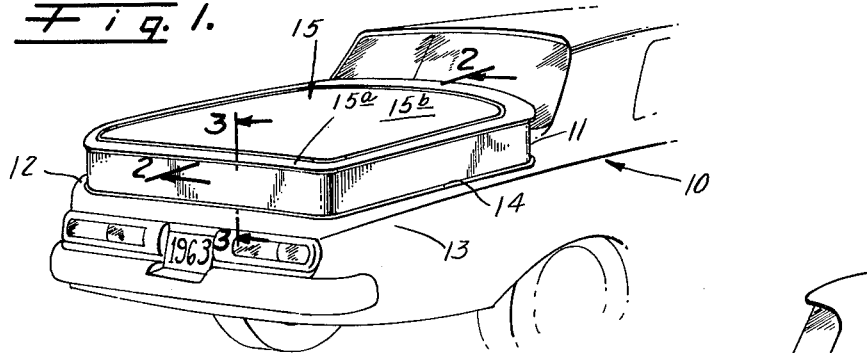
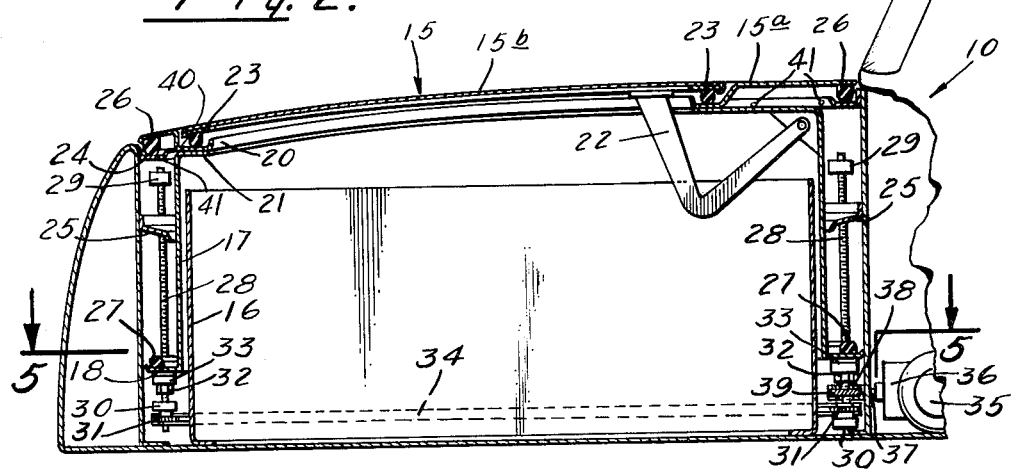
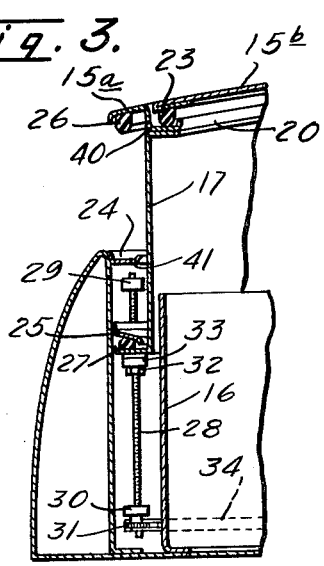
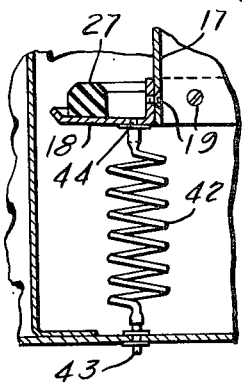
INVENTOR.
Milton Jakosky
BY
Robert M. McManigal
Attorney Feb. 8, 1966  M. JAKOSKY  3,233,936
EXPANDABLE CARGO COMPARTMENT FOR A VEHICLE
Filed Sept. 16, 1963  2 Sheets-Sheet 2
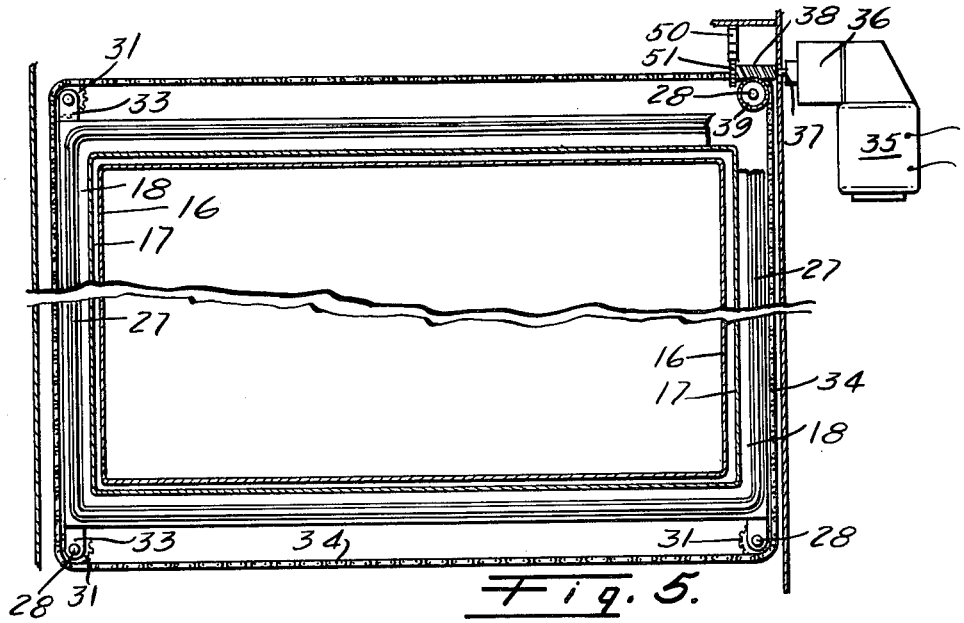
Fig. 5.
Fig. 6.
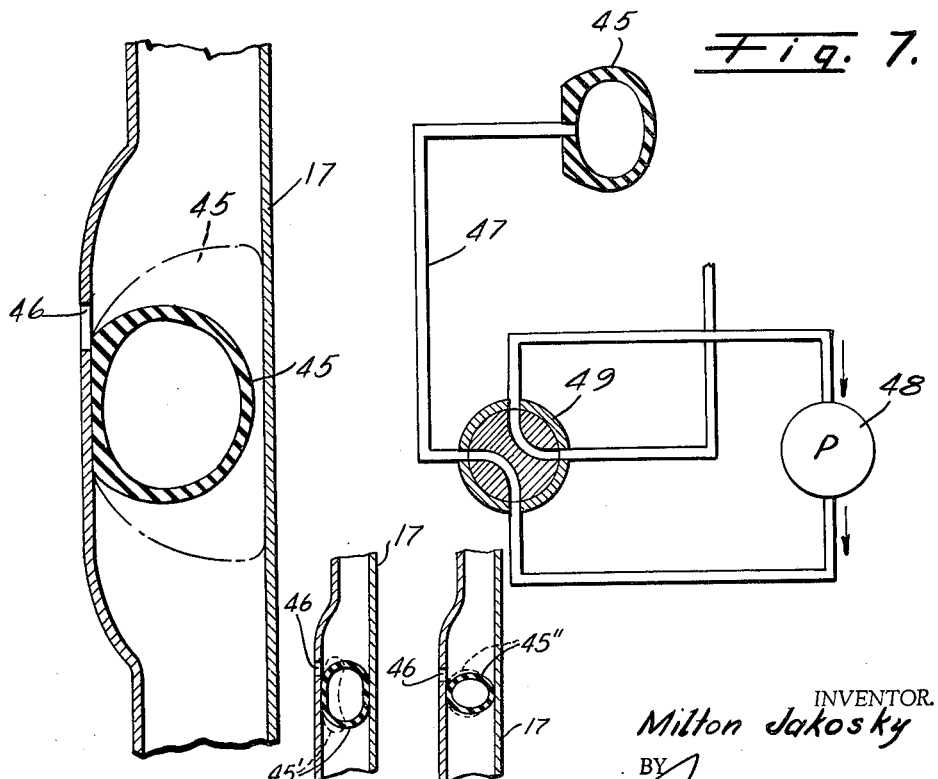
Fig. 7.
Fig. 6a  Fig. 6b
INVENTOR.
Milton Jakosky
BY
Robert M. McManigal
Attorney 3,233,936
EXPANDABLE CARGO COMPARTMENT
FOR A VEHICLE
Milton Jakosky, 9730 Lockford St., Los Angeles 35, Calif.
Filed Sept. 16, 1963, Ser. No. 309,044
10 Claims. (Cl. 296—76)

The present invention relates generally to vehicle bodies, and is more particularly concerned with a cargo or luggage compartment construction such that the compartment may be expanded to increase its storage capacity.

The concepts embodied in the present invention will be primarily described as being applied to automobile bodies, it being understood that the invention has broad application and may be utilized with other types of vehicles such as trucks, aircraft, railway cars and the like.

The present design trends in automobile bodies, in order to provide the currently popular streamlining and low-slung silhouette, has placed limitations upon the capacity of cargo or luggage compartment which may be provided. This limitation is primarily one of depth, and becomes especially significant in automobiles of medium size and sports type in which the volumetric capacity becomes extremely limited.

Inadequate cargo storage space can also impose limitations with respect to the use of the automobile. While cargo compartments of limited capacity may be satisfactory and acceptable for short-haul use or for intra-city transportation, such vehicles would be unsuitable for extended trips where increased capacity becomes a necessity to accommodate the needed luggage.

Moreover, the size of luggage or cargo compartment which is available can also dictate the purchaser's choice of an automobile. For example, a traveling salesman whose sales activities require a cargo compartment of greater size than would normally be obtainable in a medium size or reasonably priced automobile. Under such circumstances, the salesman may be forced to purchase a larger car than would otherwise best meet his needs, in order to obtain a large or oversize cargo compartment.

As a result of the foregoing, needed cargo capacity is often obtained by dangerous makeshift methods which are hazardous and do not protect the contents in the cargo compartment from weather, dust or possible pilferage or theft. One such makeshift method is to over-fill the compartment, leaving the lid in a partly raised position and holding it firmly by means of a tie-down cord or rope. Another make-shift method is to stow the extra cargo on the top of the automobile either in a bin temporarily installed for the purpose, or by securing the cargo in a railed enclosure. The top storage method has the further objection that the elevated disposition of the cargo weight adversely affects steering control.

Having in mind the foregoing, it is one object of the present invention to provide a vehicle body having a cargo compartment which may be used in the usual and normal manner for the average and usual storage purposes, but when the occasion demands, may be expanded so as to provide greater cargo capacity.

A further object of the herein described invention is to provide a cargo or luggage compartment which may be expanded from a normal size capacity so as to have an increased storage capacity, and which under either condition of use will be water and dust-proof, provide protection against the weather, and may be secured in either case to prevent pilferage or theft of its contents.

A still further object resides in the provision of an expandable cargo compartment of simple and dependable construction, which may be incorporated into a conventional standard vehicle body with little or no change over that required for the conventional fixed-capacity cargo compartment.

Another object is to provide in an expandable vehicle cargo compartment, unique means for sealing the parts against water leakage both before and after expansion.

Still another object resides in the provision of power-driven means for converting the size of the cargo compartment in a vehicle from one capacity to another capacity.

It is also an object to provide signal indicating means for automatically generating a signal during the time that the cargo compartment is being changed from one size to another.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a perspective view of an automotive vehicle embodying an expandable cargo compartment according to the present invention, the compartment-forming structure being shown in expanded position;

FIG. 2 is an enlarged fragmentary view including a longitudinal section through the cargo storage compartment, taken substantially on line 2—2 of FIG. 1, the compartment-forming parts being in retracted position;

FIG. 3 is an enlarged fragmentary vertical section through the rear end of the cargo storage compartment, taken substantially on line 3—3 of FIG. 1, the compartment-forming parts being in extended position;

FIG. 4 is an enlarged fragmentary sectional view showing the details of the arrangement to provide water drainage;

FIG. 5 is a fragmentary horizontal sectional view, taken substantially on line 5—5 of FIG. 2, and showing the inter-relationship of the compartment-forming parts and details of the actuating means for operating the parts to the extended and retracted positions;

FIGS. 6, 6a and 6b are views respectively disclosing details of modified sealing arrangements utilizing a tubular sealing member; and FIG. 7 is a view diagrammatically showing a fluid pressurized control system for sealing members such as shown in FIGS. 6, 6a and 6b.

Referring now to the drawings, for illustrative purposes, the present invention is shown as being embodied in an automotive vehicle, as generally indicated by the numeral 10, of the type in which the rear end of the body structure is provided with an upper shell wall 11 and opposite side walls 12 and 13 which cooperate to form a rear cargo or luggage compartment; access to which is usually provided through an access opening as indicated at 14. In the conventional arrangement, a movable lid or cover having a hinged connection with the top wall of the body provides a closure for normally closing the access to the compartment, but may be opened to provide access when desired.

In the arrangement of the present invention, the access opening 14 is arranged to be closed by a lid structure as generally indicated by the numeral 15, the lid structure in this case comprising two sections, a peripheral outer section 15a and an inner main section 15b which is hinged for movement to opened and closed positions in a manner and for the purpose which will hereinafter be explained more fully.

As best shown in FIG. 2, the conventional cargo space according to the present invention is provided with a telescoping side wall structure which is shown as being of substantially rectangular configuration, although other configurations may be used. The wall structure comprises two wall sections having telescoping relation, an inner section 16 and an outer section 17.

The inner section 16 is fixedly mounted and has an open upper end through which cargo or luggage can be placed therein. The inner section serves as a protective barrier and prevents the cargo from coming into contact with the raising and lowering mechanism for the outer section 17.

The outer section 17 is made slightly larger than the inner section so that the adjacent ends of the sections may be mounted in telescoping relation. The inner bottom end of the section is shown as being provided with a peripheral outwardly projecting end flange 18 which is removably secured to the associated end of the section by means of securing screws 19 that facilitate the installation and assemblage of the wall sections. At its uppermost end, the outer section 17 supports the lid structure 15.

As best shown in FIG. 2, the lid structure section 15a is shown as comprising a ring-like member having an inner peripheral channel 20 which is securely affixed as by welding or other conventional means to an inwardly extending end flange 21 at the upper end of the wall section. As thus mounted, the section 15a is positioned above the end of the wall section and also projects at its periphery beyond the section walls.

The inner section 15b is hingedly supported at its forward edge, as by suitable pivoted arms 22 (one only being shown) for swinging movement to opened and closed positions to provide access to the compartment space in either the extended or retracted positions of the wall structure. The section 15b is sealed in closed position by a peripheral sealing strip 23 which is adapted to seat in the channel 20. In the retracted position of the outer section 17, it will be noted that the lid sections 15a and 15b have contour configurations which carry out the contour of the conventional top wall body design.

In the arrangement shown in FIGS. 2 and 3, the outer section 17 is supported for movement between lower retracted and raised extended positions which are dictated by a pair of fixed ring abutment flanges 24 and 25, these flanges being secured in vertical spaced relation to adjacent portions of the body structure as by welding or other conventional securing means. While two flanges have been utilized in the illustration, it is within the purview of the present invention to utilize a single flange, if desired.

The upper flange 24 is constructed to provide a channel which serves as a seat for a peripheral sealing strip 26 carried by the lid section 15a. The sealing strip may be constructed of sponge rubber or other suitable material and operates to provide a leak-proof seal between the body and the interior of the compartment in the closed or retracted position of the wall section 17. The end flange 18 is also provided with an elongate sealing strip 27 which is adapted to seat against the abutment flange 25 in the extended position of the section 17. The abutment flanges 24 and 25 are shown as being provided with inclined inner edge margins which operate with a wedging action with respect to the sealing strips. The sealing strips 26 and 27 additionally serve to provide rigidity of support for the outer wall section 17 in both extended and retracted positions.

Movement of the outer wall section 17 to extended and retracted positions is accomplished by a plurality of elevator mechanisms which, in the present instance, are shown as being respectively positioned adjacent the four corners of the wall section. Each of the actuators comprises a vertically extending screw 28 which is rotatably supported in upper and lower bearings 29 and 30, respectively, affixed to adjacent portions of the body structure. Each screw at its lowermost end carries a sprocket wheel 31 by means of which it is rotated. A nut member 32 is in threaded engagement with the screw 28, this nut being fixed to a bracket 33 which is secured to the outer wall section 17, in this instance to the end flange 18. It will thus be apparent that by simultaneously operating the screws 28 in opposite directions, the outer section 17 may be selectively moved to extended and retracted positions, as desired. The screws 28 are simultaneously operated by means of a single chain 34 which is trained over the sprocket wheels 31 of the respective elevating mechanisms.

The elevating mechanisms may be actuated by a hand crank or suitable power device which may be a hydraulic motor or electric motor. For illustrative purposes, the actuating mechanism in the present instance is shown as comprising an electric motor 35 that is connected through a suitable gear reduction and torque limiting means such as a friction clutch 36 to a drive shaft 37 which carries a worm 38 having driving connection with a worm gear 39 associated with one of the screws 28. As shown in FIG. 5, the worm wheel is, in this case, associated with the forward left elevator screw 28.

The use of a friction clutch 36 is advantageous in that a more simple and dependable actuator results through the elimination of limit switches. Also, the use of torque limiting means such as a friction clutch assures that the desired sealing pressure will be obtained for the sealing strips 26 and 27 in the retracted and extended positions of the wall section 17.

Water is prevented from entering the compartment by providing drainage facilities. Drain openings 40, for example, may be placed at intervals along the outer margin of the channel 20, and openings 41 placed along the inner margin of the channel in abutment flange 24 to take care of water which seeps past the sealing strip 26 in the retracted position of the wall section 17. Any water which flows along the outer surface of wall section 17 in its extended position will be drained off by providing one or more conduits such as hoses 42 of plastic or other suitable material which is spiraled as shown in FIG. 4, one end of the hose being connected to a drain outlet 43 and the other end being connected to a connection 44 having communication with the inner marginal portion of the end flange 18. These drain hoses are strategically placed at low gravitational points, and being spiraled will be extendable and retractable as the wall section 17 is moved to extended and retracted positions.

The expandable cargo compartment structure as described above provides an arrangement in which the outer wall section will be disposed either at its inner retracted limit of movement or at its limit of extended movement. Thus, the compartment is selectively adjustable to a minimum capacity or a maximum capacity, but is not adjustable to an intermediate capacity between these limits.

Referring to FIG. 6, a modified construction is shown which will permit sealing the outer wall section 17 in any position of its movement regardless of whether it is in a retracted, extended or intermediate position. In this arrangement, it is proposed to eliminate the end flange 18 and its associated sealing strip 27, as well as the abutment flange 25. In their stead, it is proposed to provide a tubular sealing member 45 which may be attached to a permanent wall of the body structure so as to surround the wall section 17 and thus form a support for the tubular sealing member so that it will be disengaged with respect to the wall section 17. As shown, drain openings 46 are provided above the sealing member to drain off any accumulation of water above the sealing member when it is engaged with the wall section.

In the arrangement shown in FIG. 7, it is proposed to provide a fluid connection 47 to the sealing member by means of which the interior of the sealing member may be connected with a source of fluid pressure, such as a pressure tank or as shown in the present instance, a pump 48. A valve 49 is provided which permits connecting the pump so that it is possible to disconnect or cut off the connection 47 with respect to the pressure source, connect the pump so as to supply pressurized fluid to the tubular member or, if desired, supply a suction to the tubular sealing member.

Referring again to FIG. 6, it will be seen that the application of pressure to the sealing member 45 would cause it to expand and assume a contour of the character shown in phantom lines in which position it would sealingly engage the adjacent wall of the section 17. Release of this pressure would permit movement of the sealing member to disengaged relationship or unsealed position.

The utilization of a tubular sealing member lends itself to several different modes of operation, and as an alternative to that shown in FIG. 6, the tubular sealing member 45 may be arranged as indicated at 45' in FIG. 6a so as to normally sealingly engage the wall of section 17, without being pressurized. To accomplish unsealing in this case, a vacuum or negative pressure would be applied to the sealing member. The suction would cause a collapse of the tubular sealing member and force it to assume a contour as shown in phantom lines, in which condition, it is in unsealed or disengaged relationship with the wall of section 17. This arrangement has the advantage that in case of loss of suction source, the sealing member still remains in its sealing position. The arrangement is thus "fail safe."

Another "fail safe" arrangement would be to provide a tubular sealing member having greater diameter in one direction than the other as indicated at 45" in FIG. 6b. By disposing the tubular member with its greater diameter horizontal and arranging it so that it would normally engage to form a seal with the adjacent wall of section 17, the use of pressure instead of suction can be utilized to effect unsealing. Thus, when pressure is applied, there would be a tendency of the tubular member to form into a cylinder as shown in phantom lines and thus move its engaged portion away from the wall surface to unsealing relationship therewith.

With any of the foregoing tubular sealing members, it is possible to provide a seal for the section 17 irrespective of its position.

An added safety feature is provided in the provisions of signal means which will be actuated automatically during movements of the wall section 17 in changing the capacity of the cargo compartment. The signal means may be of audible or visual type, and has been illustrated herein as comprising a spring or flexible finger 50, as shown in FIG. 5, which is secured at one end to an adjacent body part and having its free end riding upon a roughened or serrated circumferentially extending portion 51 of the worm 38.

It is believed that from a consideration of the foregoing description, it will be apparent that the structures described will accomplish the noted objects and advantages as set forth for the invention.

Various modifications may suggest themselves to those skilled in the art without departing from the spirit of my invention, and hence, I do not wish to be restricted to the specific form shown or uses mentioned, except to the extent indicated in the appended claims.

I claim:

1. In a vehicle body having a storage compartment with a top access opening:
   (a) a variable height side wall structure telescopingly movable up and down within said storage compartment to extended and retracted positions;
   (b) means carried by and movable with said wall structure for closing said top access opening in said retracted position, including cover means carried by and movable with the side wall structure, said cover means additionally being movable with respect to said side wall structure to closed and open positions in both said extended and retracted positions of said side wall structure to provide access to the space enclosed within said side wall structure in both said retracted and extended positions thereof; and
   (c) means selectively operable to move said side wall structure to said extended and retracted positions.

2. In a vehicle body having a storage compartment with an access opening:
   (a) a side wall structure in said compartment having a portion supported for movements to extended and retracted positions through said opening;
   (b) cover means carried by said wall portion movable to opened and closed positions to provide an access closure for said compartment in both the extended and retracted positions of said wall portion, and in the retracted position acting to normally close the access opening;
   (c) means for selectively actuating said wall structure portion to said extended and retracted positions; and
   (d) signal means on the vehicle energized during movement of the side wall structure portion to said extended and retracted positions, said signal means operatively connected to said actuating means and responsive to actuation thereof.

3. In a vehicle body having a storage compartment with a top access opening:
   (a) a side wall structure in said compartment supported for movement through said opening to extended and retracted stop limit positions of movement;
   (b) cover means carried by and movable with said wall structure for closing said top opening in said retracted position, including a hinged portion mounted for movement to opened and closed positions with respect to the space within said side wall structure, in the extended and retracted positions thereof; and
   (c) means for selectively moving said side wall structure from one of said limit positions to the other including torque limiting means.

4. In a vehicle body having a storage compartment with a top access opening:
   (a) a side wall structure in said compartment supported for movement through said opening to extended and retracted stop limit positions of movement;
   (b) cover means carried by and movable with said wall structure for closing said top opening in said retracted position, including a hinged portion mounted for movement to opened and closed positions with respect to the space within said side wall structure, in the extended and retracted positions thereof;
   (c) means for selectively moving said side wall structure from one of said limit positions to the other; and
   (d) sealing means operable at said limit positions for sealing said side wall structure and said cover means with respect to the surrounding body.

5. In a vehicle body having a storage compartment with a top access opening:
   (a) a side wall structure in said compartment supported for movement through said opening to extended and retracted limit positions of movement;
   (b) pivoted cover means carried by and movable with said wall structure to provide access to its interior and close said top opening in the retracted position of the wall structure;
   (c) means for moving said wall structure; and
   (d) means for sealing the cover means and side wall structure respectively with respect to the surrounding body in said retracted and extended positions.

6. In a vehicle body having a storage compartment with a top access opening:
   (a) a side wall structure in said compartment supported for movement through said opening to extended and retracted limit positions of movement;
   (b) pivoted cover means carried by and movable with said wall structure to provide access to its interior and close said top opening in the retracted position of the wall structure;
(c) means for moving said wall structure;
(d) peripheral sealing strips respectively carried by said cover means and said wall structure; and
(e) abutment flange means carried by the adjacent body for sealing engagement by said strips.

7. In a vehicle body having a storage compartment with a top access opening:
(a) a side wall structure in said compartment supported for movement through said opening to extended and retracted limit positions of movement;
(b) cover means carried by and movable with said wall structure to provide access to its interior and close said top opening in the retracted position of the wall structure;
(c) means for moving said wall structure; and
(d) a fluid deformable member between said wall structure and the adjacent body, and being selectively controlled through said fluid to effect sealing and non-sealing operations thereof.

8. The combination in a vehicle body having a storage compartment with an access opening according to claim 7, wherein the deformable member is tubular and normally occupies a non-sealing relationship, but will be distorted into sealing relationship by the introduction of a pressurized fluid thereinto.

9. The combination in a vehicle body having a storage compartment with an access opening according to claim 7, wherein the deformable member is tubular and normally occupies a sealing relationship, but will be distorted into non-sealing relationship upon being interiorly subjected to a fluid suction.

10. In a vehicle body having a storage compartment with a top access opening:
(a) a side wall structure in said compartment supported for movement through said opening to extended and retracted limit positions of movement;
(b) cover means carried by and movable with said wall structure to provide access to its interior and close said top opening in the retracted position of the wall structure;
(c) means for moving said wall structure;
(d) means operative to seal said wall structure with respect to the surrounding body in an extended position of the wall structure; and
(e) means providing a fluid conducting channel for draining fluid away from said seal including an extendable and retractable conduit having one end connected with the wall structure and its other with the body structure.

References Cited by the Examiner
UNITED STATES PATENTS

| | | | |
|---|---|---|---|
| 1,643,741 | 9/1927 | Ledwinka | 296—76 X |
| 2,246,813 | 6/1941 | Preston | 296—26 |
| 2,862,253 | 12/1958 | Place | 296—23 X |
| 2,890,908 | 6/1959 | McLean | 296—37 |
| 3,061,358 | 10/1962 | Lien | 296—26 |
| 3,107,649 | 10/1963 | Blend | 296—26 X |
| 3,145,046 | 8/1964 | Orn | 296—26 |

BENJAMIN HERSH, *Primary Examiner.*

A. HARRY LEVY, MILTON BUCHLER, *Examiners.*